Nov. 8, 1955

S. W. LEWINTER 2,723,345

RADIO RECEIVER SYSTEM

Filed Oct. 7, 1952

INVENTOR
SIDNEY W. LEWINTER
BY Ernest Fanwick
ATTORNEY

United States Patent Office 2,723,345

Patented Nov. 8, 1955

2,723,345

RADIO RECEIVER SYSTEM

Sidney W. Lewinter, Verona, N. J., assignor to International Telephone and Telegraph Corporation, a corporation of Maryland Application October 7, 1952, Serial No. 313,477

5 Claims. (Cl. 250—20)

This invention relates to radio receiver systems and more particularly to a radio receiver which enhances the signal-to-noise ratio of a received amplitude modulated signal.

It is well known that noise produces both an amplitude and a frequency modulation of a carrier wave. A presently known modulation method which is capable of yielding an improved signal-to-noise ratio in the output of a radio receiver transmits a signal in which the modulation produced by the intelligence is large compared to any modulation introduced by noise. The frequency modulation introduced by noise can be made negligibly small relative to the signal modulation simply by increasing the deviation in frequency produced by the intelligence modulation. However, when the carrier energy is amplitude modulated, the carrier cannot be modulated by the intelligence in excess of 100 per cent, and modulation introduced by noise is capable of having a comparable effect. As a result, it is well known that wide band frequency modulation is capable of having a better signal-to-noise ratio than standard amplitude modulation transmission.

In the usual known systems of improving the signal-to-noise ratio in amplitude modulation reception, a time correlation occurs between the received signal and an identical signal somewhat delayed in time. These known systems thus require the use of a delay line or its equivalent, introducing additional cost and complexity into the receiver or transmitter circuit. If the interference is of a relatively long time duration, the usual time correlation methods will not result in any improvement and might even result in a decrease in the signal-to-noise ratio.

One of the objects of this invention, therefore, is to provide a receiver for amplitude modulated signals having an enhanced signal-to-noise ratio.

Another object of this invention is to provide a receiver for amplitude modulated signals utilizing a frequency correlation to improve the signal-to-noise ratio.

A feature of this invention is the use of two well-known standard amplitude modulation sideband receivers, one designed for receiving the upper sideband of the transmitted signal and the other designed to receive the lower sideband of the transmitted signal. The outputs of the two single sideband receivers are coupled to a multiplying circuit which takes the product of the two signals and whose output will be responsive only to the symmetrical modulation components in the output of the two sideband receivers. The output of the multiplying circuit is applied to a dividing circuit which eliminates the effects of multiplication and couples its output, which contains only the desired signal, to the usual utilization circuits.

Figure 1:
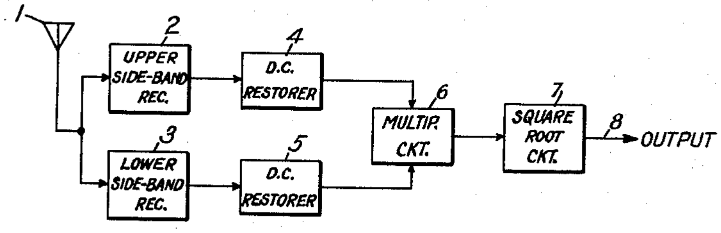
Figure 2:
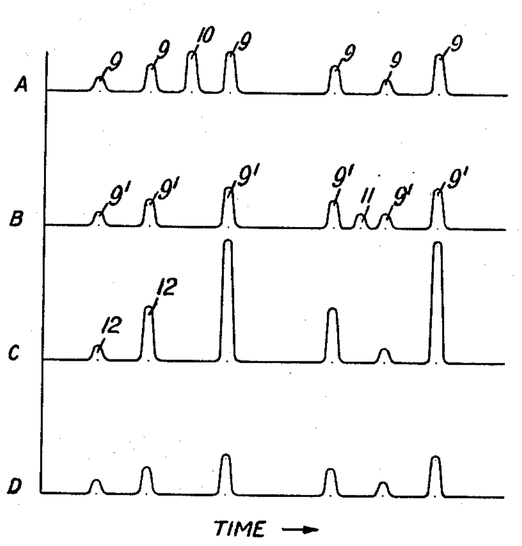

The above-mentioned and other features and objects of this invention will become more apparent by reference to the following description taken in conjunction with the accompanying drawings, in which:

Fig. 1 is a schematic diagram in block form of the amplitude modulation radio receiver system of this invention; and Fig. 2 illustrates a set of curves helpful in the explanation of this invention.

Referring to the block diagram of Fig. 1, a radio receiver system in accordance with the principles of this invention is shown wherein an amplitude modulated carrier wave having both upper and lower sideband components is received by antenna 1 and coupled to an upper sideband receiver 2 and a lower sideband receiver 3. It is well known in standard amplitude modulation transmission that sidebands produced by the modulating intelligence are always symmetrically paired. It is also true that an interfering carrier signal produces the equivalent of a single sideband transmission, i. e. a noise pulse will have a mean frequency which will be either above or below the carrier. Thus it may be assumed in Fig. 1 of the drawing that any modulation due to any particular noise pulse will appear in the output of only one or the other of receivers 2 and 3. Since the sidebands produced by the modulating intelligence at the transmitter are symmetrically paired, the output of the upper and lower sideband receivers 2 and 3 will be symmetric except for noise components which appear in only one or the other of the two receiver outputs. If the modulating intelligence at the transmitter is speech or an equivalent intelligence signal, the modulation will be both positive and negative with respect to a zero level. Thus when this type of signal is received, the outputs of the sideband receivers 2 and 3 are coupled to D.-C. restorers 4 and 5 to eliminate ambiguity as to sign in the output of multiplier circuit 6 which would result due to multiplication of a mixture of positive and negative quantities. An ambiguity of sign would result when extracting the positive and negative roots of the product resulting from the action of multiplier 6. This ambiguity of sign can be substantially eliminated by employing well-known D. C. restorer circuits to raise a negative modulation component to coincide in polarity with positive modulation components with respect to a reference level by insertion of an appropriate D. C. component therein to assure that the practical positive root is always selected, consistent with the components forming the product, for future utilization when the square root of the multiplied output of circuit 6 is derived by the operation of circuit 7. The symmetric signals from sideband receivers 2 and 3 are coupled to multiplier circuit 6, where they are multiplied along with the noise which at any one time is present in the output of only one of the receivers 2 or 3. The output of the multiplying circuit which is responsive to symmetrically paired amplitude modulation components and not to an unsymmetrical noise signal is coupled to a square root circuit 7 which eliminates the multiplication effects on the signal caused by multiplying circuit 6. The output from square root circuit 7 is coupled to the usual utilizing circuit via line 8.

Referring to Fig. 2, the sideband frequency spectrum waveforms at various points in this receiver system are shown. The frequency spectrum of the output of upper sideband receiver 2 illustrated by curve A is seen to consist of sideband signal pulses 9. Curve B shows the frequency spectrum of the output of the lower sideband receiver. The desired sideband signal pulses 9' are seen to be symmetric with the sideband signal pulses 9. To show how this system can mitigate noise, assume that a noise pulse having a mean frequency above the carrier frequency is introduced at time $T_1$. This noise signal will appear as a pulse 10, curve A, in the output of the upper sideband receiver. This noise being random in nature may occur at any point along the time axis of curve A, but for purposes of clarity it is shown to exist between pulses of a received periodic signal. It is obvious that since this pulse 10 has a mean frequency above the carrier, it will not appear in the output of the lower sideband receiver. However, a noise pulse 11 may appear in the output of the lower sideband receiver 3. Being random in nature, it is very unlikely that pulse 11 will appear at the same point in time in the output of receiver 2.

The two waveforms shown in curve A and curve B are coupled to a multiplying circuit 6 where a frequency correlation takes place, and the output of this multiplying circuit is shown in Fig. 2, curve C to represent the amplitude product of the symmetric sideband signals of curves A and B. It is, of course, obvious that the amplitude of the pulses 12 in curve C will be the equivalent of the square of the desired pulses shown in either curve A or curve B since those two curves were symmetrical as to amplitude and time or frequency displacement from the carrier frequency. However, the noise pulses not being symmetrical in both receivers are eliminated in the multiplying circuit 6 since a given noise amplitude times a zero amplitude results in a product output therefrom equal to zero. In order to restore the output of the multiplying circuit to the desired signal amplitude relation, it is necessary to obtain the square root of the multiplied waveform as shown in curve D. This square root extraction process is accomplished in a known square root circuit 7.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a receiver for amplitude modulated radio signals, means to separately detect the upper and lower sideband energy of said signals, means coupled to said means to separately detect to multiply said detected sideband energy, and means coupled to said means to multiply to extract the square root of the output of said multiplier means.

2. A receiver system for radio signals of the amplitude modulated type comprising a first receiver to detect the upper sideband energy of said amplitude modulated signals, a second receiver to detect the lower sideband energy of said amplitude modulated signals, and means coupled to said first and second receivers to multiply together the outputs therefrom to thereby eliminate those energy variations which are not common in the outputs of the two receivers.

3. A radio receiver system according to claim 2, which further includes means coupled to said sideband receivers to impress a D. C. voltage component on the outputs therefrom.

4. A radio receiver system for receiving signals having a carrier frequency impressed with symmetrical sideband modulation components comprising means to detect separately said symmetrical components, and means coupled to said means to detect to multiply the symmetrical components thus detected to eliminate unsymmetrical signals appearing in the outputs of said detector means.

5. A radio receiver system according to claim 4, further including means coupled to said multiplier means to extract the square root of the multiplication product derived therefrom.

References Cited in the file of this patent

UNITED STATES PATENTS

| | | |
|---|---|---|
| 2,163,680 | Hansell | June 27, 1939 |
| 2,178,552 | Barger | Nov. 7, 1939 |
| 2,519,223 | Cheek | Aug. 15, 1950 |
| 2,535,257 | Berger | Dec. 26, 1950 |
| 2,564,014 | Lanuza | Aug. 14, 1951 |
| 2,611,036 | Norgaard | Sept. 16, 1952 |